(12) United States Patent
Tanaka et al.

(10) Patent No.: US 11,639,003 B2
(45) Date of Patent: May 2, 2023

(54) TEACHING DEVICE AND ROBOT SYSTEM

(71) Applicant: Seiko Epson Corporation, Tokyo (JP)

(72) Inventors: Toshio Tanaka, Azumino (JP);
Masahiko Kobayashi, Chino (JP);
Yasutomo Takahashi, Matsumoto (JP);
Munenori Sawada, Matsumoto (JP)

(73) Assignee: SEIKO EPSON CORPORATION

( * ) Notice: Subject to any disclaimer, the term of this patent is extended or adjusted under 35 U.S.C. 154(b) by 357 days.

(21) Appl. No.: 16/857,240

(22) Filed: Apr. 24, 2020

(65) Prior Publication Data
US 2020/0338748 A1 Oct. 29, 2020

(30) Foreign Application Priority Data
Apr. 25, 2019 (JP) .............................. JP2019-083740

(51) Int. Cl.
*B25J 13/06* (2006.01)
*B25J 9/00* (2006.01)
*B25J 19/06* (2006.01)
*B25J 13/08* (2006.01)

(52) U.S. Cl.
CPC .............. *B25J 13/06* (2013.01); *B25J 9/0081* (2013.01); *B25J 13/081* (2013.01); *B25J 19/066* (2013.01)

(58) Field of Classification Search
CPC ........ B25J 13/06; B25J 9/0081; B25J 13/081; B25J 19/066; B25J 9/1664; B25J 9/1679
See application file for complete search history.

(56) References Cited

U.S. PATENT DOCUMENTS

| | | | |
|---|---|---|---|
| 9,387,587 B2 * | 7/2016 | Som | B25J 9/161 |
| 2015/0051736 A1 | 2/2015 | Mu et al. | |
| 2016/0114478 A1 * | 4/2016 | Wu | B25J 13/06 901/3 |
| 2016/0297076 A1 * | 10/2016 | Riedel | B25J 13/06 |
| 2018/0136631 A1 * | 5/2018 | Takahashi | B25J 13/06 |
| 2018/0157239 A1 * | 6/2018 | Bordegnoni | G06F 3/0425 |
| 2018/0229363 A1 | 8/2018 | Kurihara et al. | |
| 2018/0297212 A1 * | 10/2018 | Kino | H01H 21/24 |
| 2019/0126489 A1 * | 5/2019 | Wada | B25J 19/06 |
| 2019/0299404 A1 * | 10/2019 | Mu | B25J 9/163 |

FOREIGN PATENT DOCUMENTS

| | | | |
|---|---|---|---|
| JP | H06155347 A | 6/1994 | |
| JP | H11-259171 A | 9/1999 | |
| JP | 2017-202550 A | 11/2017 | |
| JP | 2018-517571 A | 7/2018 | |
| JP | 2018-130803 A | 8/2018 | |
| JP | 2018-167396 A | 11/2018 | |

* cited by examiner

*Primary Examiner* — Kira Nguyen
(74) *Attorney, Agent, or Firm* — Harness, Dickey & Pierce, P.L.C.

(57) ABSTRACT

According to an aspect, there is provided a teaching device on which portable terminal equipment is mounted, the teaching device being used to teach operation to a robot. The teaching device includes a case section including a mounting surface on which the portable terminal equipment is mounted. The case section includes a first member including a stop switch for stopping the operation of the robot and configured to restrict the portable terminal equipment's moving in a first direction extending along the mounting surface and a second member provided to be capable of moving in the first direction relatively to the first member and configured to restrict the portable terminal equipment's moving in an opposite direction of the first direction.

9 Claims, 6 Drawing Sheets

TEACHING DEVICE AND ROBOT SYSTEM

The present application is based on, and claims priority from JP Application Serial Number 2019-083740, filed Apr. 25, 2019, the disclosure of which is hereby incorporated by reference herein in its entirety.

BACKGROUND

1. Technical Field

The present disclosure relates to a teaching device and a robot system.

2. Related Art

As a teaching device that teaches operation to a robot, there has been known a teaching device including a robot operation section including a stop button for the robot (for example, JP A-2017-202550 (Patent Literature 1)). In the teaching device, portable terminal equipment is detachably coupled to the robot operation section.

In the teaching device in the past, when the type of the portable terminal equipment coupled to the robot operation section is changed, an attachment provided in the robot operation section needs to be replaced according to the shape of the portable terminal equipment of the type in use. Accordingly, some operator requires a time to replace the attachment.

SUMMARY

According to an aspect of the present disclosure, there is provided a teaching device on which portable terminal equipment is mounted, the teaching device being used to teach operation to a robot. The teaching device includes a case section including a mounting surface on which the portable terminal equipment is mounted. The case section includes: a first member including a stop switch for stopping the operation of the robot and configured to restrict the portable terminal equipment's moving in a first direction extending along the mounting surface; and a second member configured to move in the first direction with respect to the first member. The second member restricts the portable terminal equipment's moving in an opposite direction of the first direction.

DESCRIPTION OF EXEMPLARY EMBODIMENTS

A. First Embodiment

Figure 1:
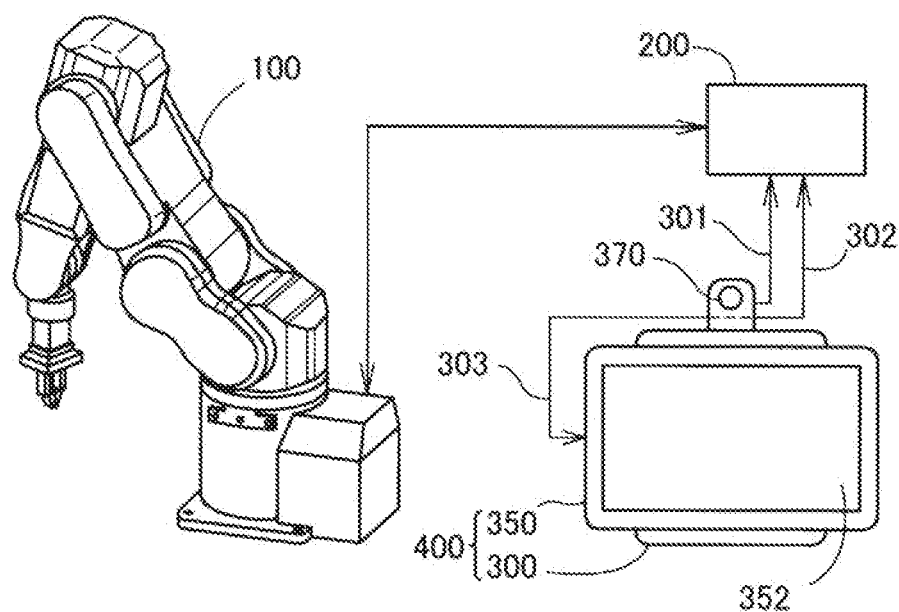
FIG. 1 is an explanatory diagram schematically showing the configuration of a robot system according to a first embodiment.

FIG. 1 is an explanatory diagram showing a robot system according to a first embodiment. The robot system includes a robot 100, a control device 200, and a teaching unit 400. The control device 200 is communicably coupled to the robot 100 and a teaching device 300 by wire.

The robot 100 is a six-axis robot including an arm including six rotary joints. The robot 100 is a human-coexistence type robot that can coexist with and perform work in cooperation with humans. Accordingly, the robot 100 can work even in an environment in which people are prohibited from entering a range where the people are likely to interfere with the robot 100. The robot 100 is not limited to the human-coexistence type six-axis robot. The robot 100 may include an arm including seven or more rotary joints or may include an arm including five or less rotary joints. The number of arms of the robot 100 is not limited to one. For example, the robot 100 may be a double-arm robot including two arms. The robot 100 may not be the human-coexistence type robot.

The control device 200 includes a processor, a main memory, and a nonvolatile memory, none of which are shown in FIG. 1. The control device 200 controls the operation of the robot 100 by driving an actuator according to teaching data stored in the main memory. Programs stored in the nonvolatile memory in advance are used to realize various functions of the control device 200. The control device 200 may be housed on the inside of the robot 100.

The teaching unit 400 is used when teaching data for work of the robot 100 is created. The teaching unit 400 includes the teaching device 300 and portable terminal equipment 350. The teaching unit 400 is called "teaching pendant" as well. The teaching data transmitted by the teaching unit 400 is stored in the main memory of the control device 200. The teaching unit 400 may be hung on a wall or may be placed on a workbench or the like and used. The teaching unit 400 may be held by an operator and used.

The portable terminal equipment 350 is mounted on the teaching device 300. The teaching device 300 is used to teach operation to the robot 100. The teaching device 300 transmits, to the control device 200, a signal indicating an instruction from a user in performing teaching. The instruction from the user in performing the teaching is, for example, an instruction to stop, an instruction to switch a teaching method, an input of teaching content, and an instruction to execute the teaching content. The switching of the teaching method is to switch, for example, a general teaching method of inputting the teaching content using the teaching unit 400 and direct teach for directly teaching the teaching content to the robot 100 by moving the robot 100.

The teaching device 300 includes only a stop switch 370 as a component that transmits a signal indicating an instruction from the user. Accordingly, when stopping the robot 100, the user is less likely to erroneously operate the robot 100. The teaching device 300 is coupled to the portable terminal equipment 350 via a connecting wire 303, which is a USB cable. The teaching device 300 is coupled to the control device 200 via a first wire 301 and a second wire 302. Since the teaching device 300 and the control device 200 are coupled by wire, certainty in stopping the robot 100 by the teaching device 300 is high.

The portable terminal equipment 350 has stored therein an application program for teaching processing for teaching operation to the robot 100. The portable terminal equipment 350 is, for example, a tablet PC or a smartphone. The portable terminal equipment 350 is used to give the robot 100 an instruction other than an instruction to stop to the robot 100. In this embodiment, the portable terminal equipment 350 is a tablet PC. The portable terminal equipment 350 includes a display 352. The display 352 is a touch panel and has a function of an operation section that receives various kinds of operation from the user and a function of a display section that displays information to the user.

The first wire 301 is used as a transmission path for transmitting, to the control device 200, a signal for instructing a stop output from the teaching device 300 when the stop switch 370 is operated by the operator. The second wire 302 is used for mutual communication between the portable terminal equipment 350 and the control device 200. A transmission path for a signal by the first wire 301 and a transmission path for a signal by the second wire 302 are systems different from each other. Accordingly, even in a state in which the portable terminal equipment 350 is not mounted, the teaching device 300 can execute an instruction to stop the robot 100. When causing the robot 100 to execute operation corresponding to teaching data, the teaching device 300 not attached with the portable terminal equipment 350 may be used as an operation section for a stop.

A signal output from the portable terminal equipment 350 is transmitted to the control device 200 via the second wire 302. On the other hand, a signal output from the control device 200 to the teaching unit 400 is transmitted to the portable terminal equipment 350 via the second wire 302 and the connecting wire 303. In this embodiment, the teaching device 300 includes only the stop switch 370 as a component capable of transmitting a signal. Accordingly, signals other than a stop signal among signals transmitted from the teaching device 300 to the control device 200 are signals input from the portable terminal equipment 350 to the teaching device 300. When the stop signal is transmitted from the teaching device 300 to the control device 200, information indicating that the stop signal is transmitted may be transmitted from the control device 200 to the portable terminal equipment 350.

Figure 2:
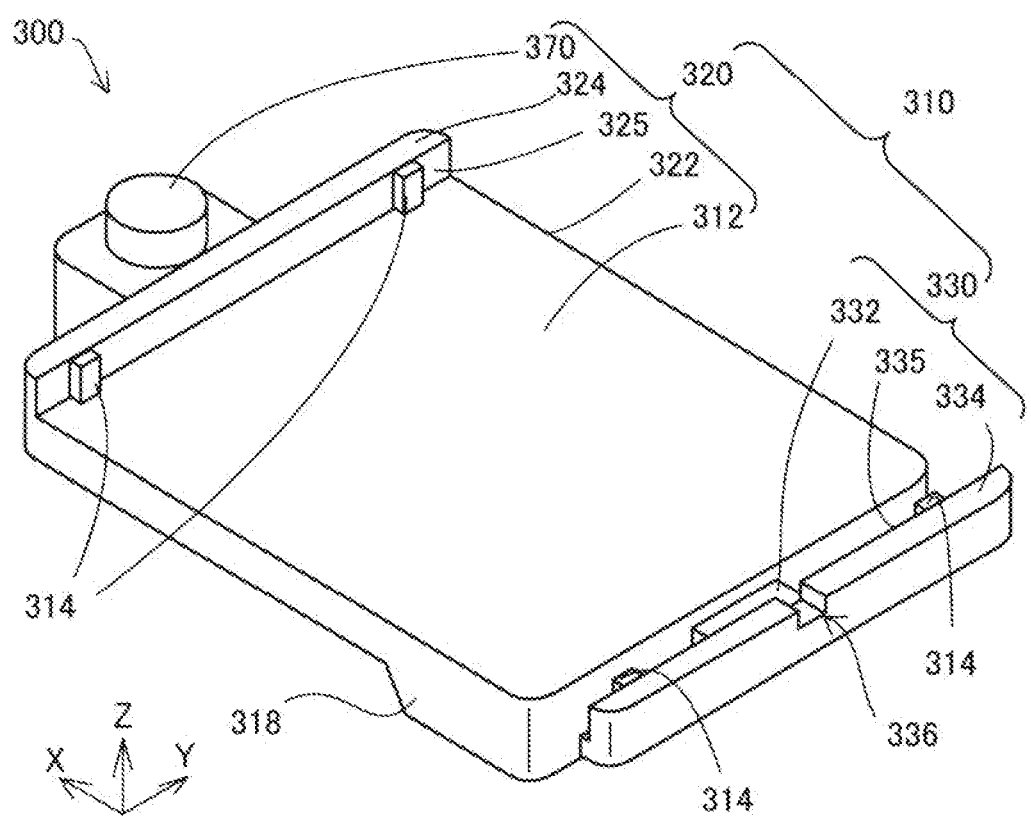
FIG. 2 is a perspective view of a teaching device.
Figure 3:
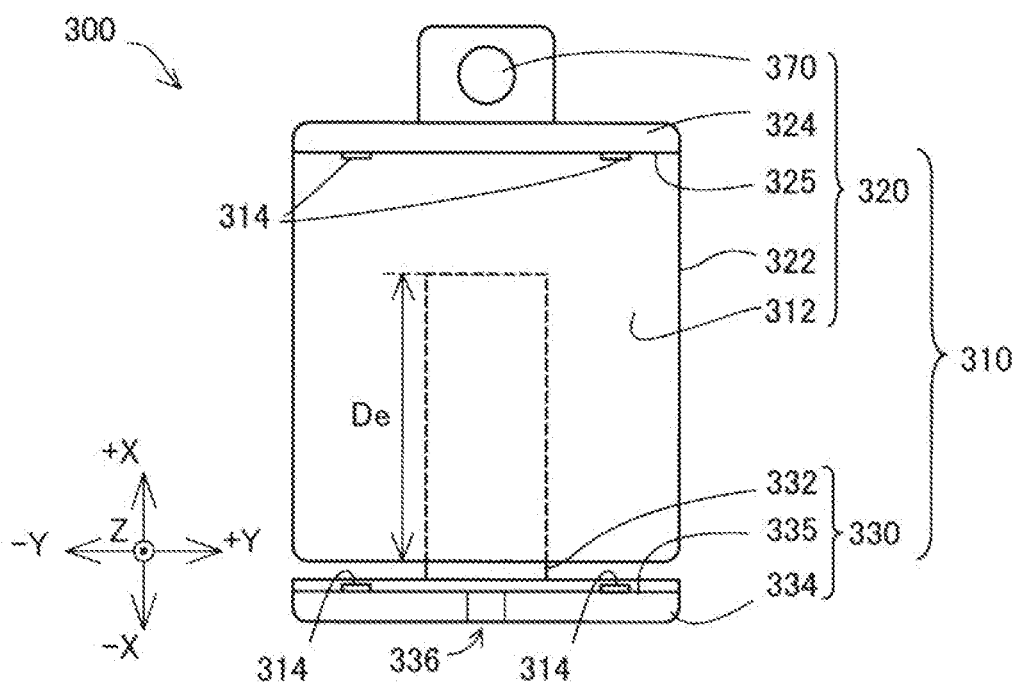
FIG. 3 is a schematic diagram of the teaching device viewed from a +Z-direction side.
Figure 4:
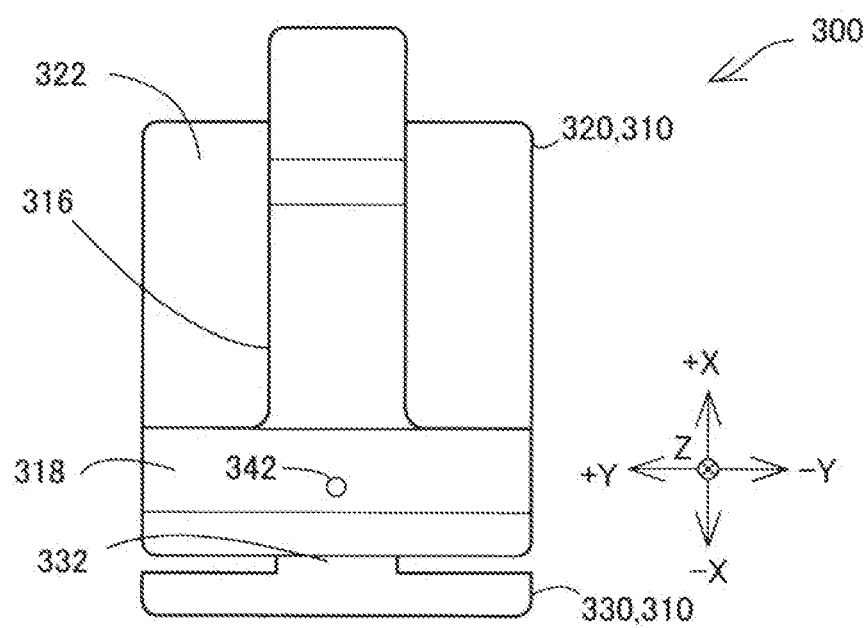
FIG. 4 is a schematic diagram of the teaching device viewed from a −Z-direction side.
Figure 5:
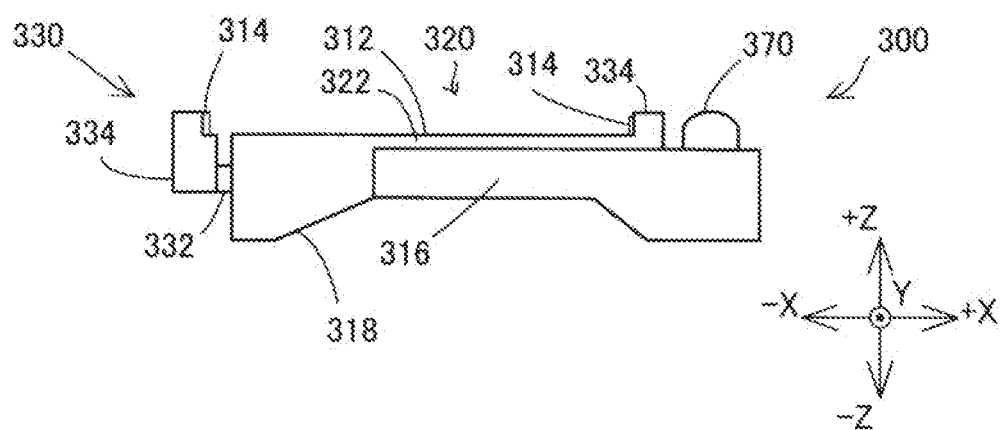
FIG. 5 is a schematic diagram of the teaching device viewed from a +Y-direction side.
Figure 6:
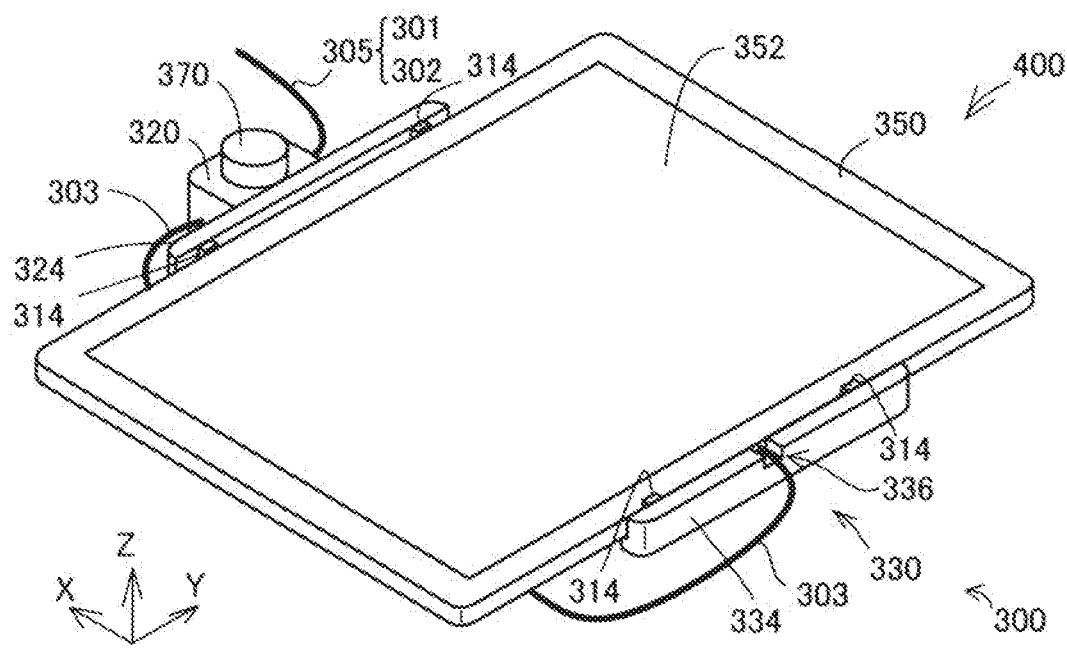
FIG. 6 is a perspective view of a teaching unit.

FIG. 2 is a perspective view of the teaching device 300. FIG. 3 is a schematic diagram of the teaching device 300 viewed from a +Z-direction side. FIG. 4 is a schematic diagram of the teaching device 300 viewed from a −Z-direction side. FIG. 5 is a schematic diagram of the teaching device 300 viewed from the +Y-direction side. FIG. 6 is a perspective view of the teaching unit 400. In FIG. 6, a state of the teaching device 300 mounted with the portable terminal 350 in the teaching unit 400 is shown. As shown in FIG. 2, the teaching device 300 includes a case section 310 on which the portable terminal equipment 350 is detachably mounted, the case section 310 including a mounting surface 312 on which the portable terminal equipment 350 is mounted. The case section 310 includes a first member 320 including the stop switch 370 and a second member 330. The second member 330 is provided to be movable in a first direction, which is one direction extending along the mounting surface 312, relatively to the first member 320. As shown in FIGS. 4 and 5, the teaching device 300 further includes a grip section 316 and a supporting section 318. Various materials such as resin can be used for a housing that forms the outer wall surface of the case section 310. In this embodiment, the housing is formed of ABS resin.

In FIG. 2, an X axis, a Y axis, and a Z axis are shown. The X axis extends in the first direction in which the second member 330 moves relatively to the first member 320 among directions extending along the mounting surface 312. The Y axis is a direction axis extending in a second direction perpendicular to the first direction among the directions extending along the mounting surface 312, that is, a direction axis perpendicular to the X axis. The Z axis is a direction axis extending in a direction perpendicular to the mounting surface 312, that is, a direction axis perpendicular to the X axis and the Y axis. Directions respectively extending along the X axis, the Y axis, and the Z axis are described as X direction, Y direction, and Z direction as well. When a direction is specified, a positive direction is represented as "+" and a negative direction is represented as "−". The positive and negative signs are used together to represent directions. In FIG. 2 and the subsequent figures, the X axis, the Y axis, and the Z axis are used for explanation.

As shown in FIG. 2, the first member 320 includes, in addition to the stop switch 370, a mounting section 322 forming the mounting surface 312 and a first restriction wall 324 projecting to the +Z-direction side from the mounting surface 312. The first restriction wall 324 includes a wall surface crossing the mounting surface 312, more specifically, a first wall surface 325 extending along the Y direction and the Z direction. The first restriction wall 324 restricts the portable terminal equipment 350 from moving in the X direction on the mounting surface 312. The first restriction wall 324 defines, with the first wall surface 325, one end, which is the end on the +X-direction side of a mounting region on which the portable terminal equipment 350 is mounted.

As shown in FIG. 3, the stop switch 370 is provided to be located in the center of the case section 310 in the Y direction. Accordingly, irrespective of whether the dominant hand of the user is the left hand or the right hand, when holding and operating the teaching device 300, the user can easily press the stop switch 370.

As shown in FIG. 2, the second member 330 includes a connecting section 332 and a second restriction wall 334. The connecting section 332 is a tabular member extending along the X direction. As shown in FIG. 3, the connecting section 332 is physically coupled to the first member 320 in a state in which a part including the end portion on the +X-direction side of the connecting section 332 is inserted into the first member 320. The second restriction wall 334 includes a second wall surface 335 opposed to the first wall surface 325. The second member 330 restricts, with the second restriction wall 334, the portable terminal equipment 350 from moving in the −X direction. The second restriction wall 334 includes a communication section 336 that causes one side and the other side across the second restriction wall 334 in the X direction to communicate. In this embodiment, the communication section 336 includes a groove formed in a part of the end portion on the +Z-direction side of the second restriction wall 334 and does not include a wall surface on the +Z-direction side. The communication section 336 may include a through-hole piercing through the second restriction wall 334 in the X direction.

Like the first wall surface 325, the second wall surface 335 extends along the Y direction and the Z direction. The second restriction wall 334 defines, with the second wall surface 335, the other end, which is the end on the −X-direction side of the mounting region on which the portable terminal equipment 350 is mounted.

The second member 330 is provided to be capable of moving relatively to the first member 320. Consequently, the distance from the first wall surface 325 to the second wall surface 335 can be adjusted. Accordingly, the teaching apparatus 300 can adjust the size in the X direction of the mounting region on which the portable terminal equipment 350 is mounted. Therefore, the teaching device 300 can adjust the size in the X direction of the mounting region according to the size of the portable terminal equipment 350. In this embodiment, a tablet PC having at least a size equal to or larger than 10 inches and equal to or smaller than 13.5 inches can be mounted on the teaching device 300. In this embodiment, depth De of insertion of the connecting section 332 into the first member 320 is adjusted, whereby the second member 330 moves relatively to the first member 320. A tablet PC having a size equal to or smaller than 10 inches or a tablet PC having a size larger than 13.5 inches may be able to be mounted on the teaching device 300. In this embodiment, a member defining the end in the Y direction of the mounting region is not provided.

A retaining member 314 is attached to each of the first wall surface 325 and the second wall surface 335. The retaining member 314 is a member that suppresses movement of the portable terminal equipment 350 in a direction crossing the mounting surface 312. In this embodiment, the retaining member 314 is a tabular member having a substantially rectangular principal plane and is formed of a rubber member having a coefficient of friction larger than that of the first wall surface 325 and the second wall surface 335. Accordingly, when the portable terminal equipment 350 is gripped by the first wall surface 325 and the second wall surface 335, the retaining member 314 is elastically deformed according to the external shape of the portable terminal equipment 350. Since the coefficient of friction of the retaining member 314 is large, movement of the portable terminal equipment 350 in directions extending along the first wall surface 325 and the second wall surface 335 is suppressed. Consequently, the portable terminal equipment 350 can be more firmly fixed by the first wall surface 325 and the second wall surface 335. A member such as rubber that suppresses movement of the portable terminal equipment 350 on the mounting surface 312 may be attached on the mounting surface 312. In this case, movement of the portable terminal equipment 350 in the Y direction can be suppressed.

The grip section 316 functions as a grip when the user holds the teaching device 300. As shown in FIG. 4, the grip section 316 has a shape projecting to the opposite side of the mounting surface 312 from the mounting section 322. As shown in FIG. 5, the width of the grip section 316 in the Y direction is small compared with the mounting section 322. Consequently, the user can hold and operate the teaching device 300 by gripping the grip section 316. The configuration of the grip section 316 is not limited to this. For example, the grip section 316 may be configured by a bar-like member that can be gripped by a hand.

When the teaching device 300 is placed on a workbench or the like, the supporting section 318 supports the mounting section 322 together with the grip section 316. As shown in FIG. 4, the supporting section 318 has a shape projecting to the opposite side of the mounting surface 312 from the mounting section 322. As shown in FIG. 5, the width of the supporting section 318 in the Y direction is large compared with the grip section 316. Consequently, the mounting section 322 can be stably placed. A screw 342 for fixing the connecting section 332 to a fixing section 340 explained below is attached to the supporting section 318 from the opposite side of the mounting surface 312.

As shown in FIG. 6, when being mounted on the teaching device 300, the portable terminal equipment 350 is disposed along the mounting surface 312. The portable terminal equipment 350 is fixed on the mounting surface 312 by being gripped or held by the first wall surface 325 and the second wall surface 335. Accordingly, in a state in which the portable terminal equipment 350 is mounted on the teaching device 300, the portable terminal equipment 350 is fixed such that the display 352 is perpendicular to the Z direction.

In the state in which the portable terminal equipment 350 is mounted, the first wall surface 325 of the first restriction wall 324 is opposed to the side surface of the portable terminal equipment 350. The second wall surface 335 of the second restriction wall 334 is opposed to a side surface of the portable terminal equipment 350. In this embodiment, a terminal connecting section, to which a terminal of the connecting wire 303 is coupled, is provided on the side surface of the portable terminal equipment 350 opposed to the second wall surface 335 of the second restriction wall 334. The side surface of the portable terminal equipment 350 is a wall surface extending in a direction crossing the principal plane, on which the display 352 is provided, in a wall surface of the portable terminal equipment 350.

A composite cable 305 is used for the coupling of the teaching device 300 and the control device 200. In the composite cable 305, a plurality of wires including the first wire 301 and the second wire 302 are collected on the inside. In this embodiment, the composite cable 305 includes, in addition to the first wire 301 and the second wire 302, a power feeding wire for receiving supply of electric power from the control device 200. Various interfaces such as RS422 and IDE can be used for coupling of the control device 200 and the teaching device 300.

Figure 7:
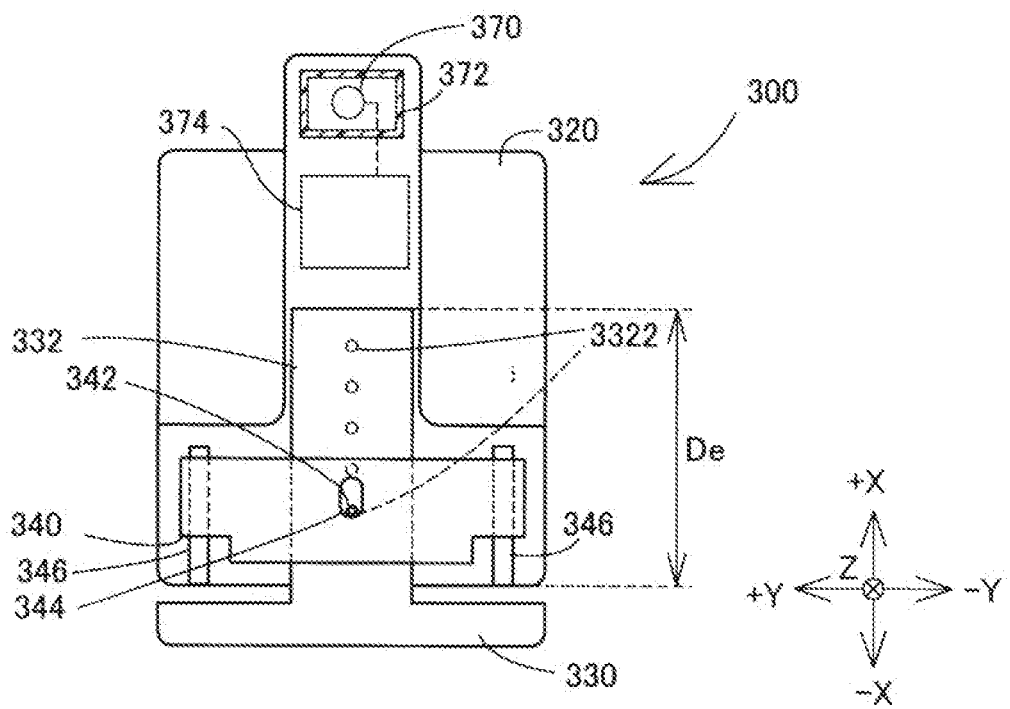
FIG. 7 is a schematic diagram showing an internal structure of the teaching device.

FIG. 7 is a schematic diagram showing an internal structure of the teaching device 300. The teaching device 300 includes, on the inside of the housing of the teaching device 300, a fixing section 340 that fixes the position of the second member 330 with respect to the first member 320. The connecting section 332 includes a plurality of attachment sections 3322 to which the screw 342 used for coupling to the fixing section 340 can be attached. The attachment sections 3322 are provided at a fixed interval along the X direction. The attachment section 3322 to which the screw 342 is attached can be changed by adjusting the depth De.

The fixing section 340 is a tabular member having rigidity. The fixing section 340 is attached to the first member 320 via coil springs 346. Consequently, the fixing section 340 is capable of moving in the X direction in a predetermined range on the inside of the first member 320. For example, when force in the −X direction is applied to the fixing section 340, the fixing section 340 moves to the −X-direction side according to the force. In this embodiment, a metal plate such as an iron plate is used for the fixing section 340.

The fixing section 340 includes a screw hole 344 into which the screw 342 is inserted. The screw hole 344 is provided to have width larger than the diameter of the screw 342 in the X direction. Accordingly, even when the screw 342 is inserted into the screw hole 344, the fixing section 340 is capable of moving in the X direction. The fixing section 340 is not limited to this and can be changed as appropriate as long as the position of the second member 330 can be fixed with respect to the first member 320.

Two coil springs 346 are disposed to sandwich at least one of a part of the fixing section 340 and a part of the connecting section 332 in the Y direction. In this embodiment, one ends in the −X-direction side of the coil springs 346 are fixed to the first member 320. The other ends in the +X-direction side of the coil springs 346 are fixed to the fixing section 340. The coil springs 346 are disposed in a state in which the coil springs 346 are elastically deformable in the X direction. The coil springs 346 are disposed between the fixing section 340 and the first member 320 in a state in which the coil springs 346 are compressed. Accordingly, an urging force applied in the +X direction is always applied to the fixing section 340. Consequently, in a state in which an external force other than the urging force is not applied, the fixing section 340 is located in a farthest initial position in +X-direction in a movable range. The distance between the second member 330 and the first member 320 is adjusted such that the position of the fixing section 340 is further on the −X-direction side than the initial position when the portable terminal equipment 350 is attached. Consequently, the portable terminal equipment 350 can be gripped by the first member 320 and the second member 330. Therefore, a mounting position of the portable terminal equipment 350 is stabilized. The number of the coil springs 346 is not limited to two. For example, the number of the coil springs 346 may be three or more or may be one. A member such as a rubber member that can apply an urging force, which is applied in the +X-direction, to the fixing section 340 may be used instead of the coil springs 346.

A part of the stop switch 370 and a circuit board 374 for outputting a stop signal when the stop switch 370 is pressed are housed on the inside of the teaching device 300. On the inside of the housing of the teaching device 300, a seal member 372 is provided between a space in which the stop switch 370 is located and a space in which the circuit board 374 is located. Consequently, foreign matters such as water and dust intruding into the circuit board 374 side from the stop switch 370 side are suppressed. Therefore, a risk of a failure of the teaching device 300 due to intrusion of foreign matters into the inside of the teaching device 300 from the outside decreases.

According to the first embodiment explained above, the size of the mounting region in the X direction in the teaching device 300 can be changed. Accordingly, in the teaching device 300, it is possible to mount the portable terminal equipment 350 having any size on the case section 310 without separately preparing a member for changing the mounting region, for example, an attachment.

B. Second Embodiment

Figure 8:
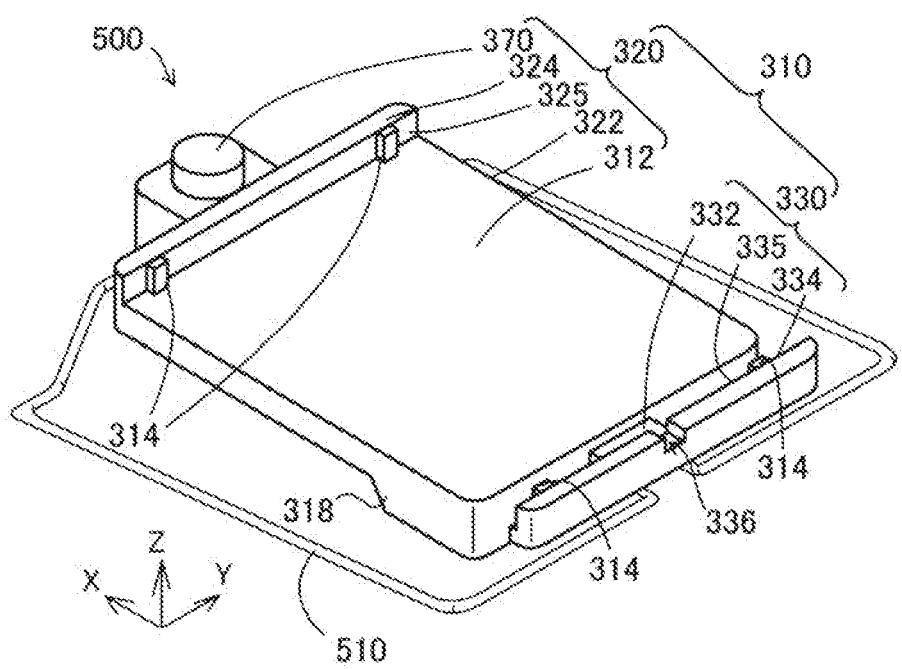
FIG. 8 is a perspective view of a teaching device in a second embodiment.
Figure 9:
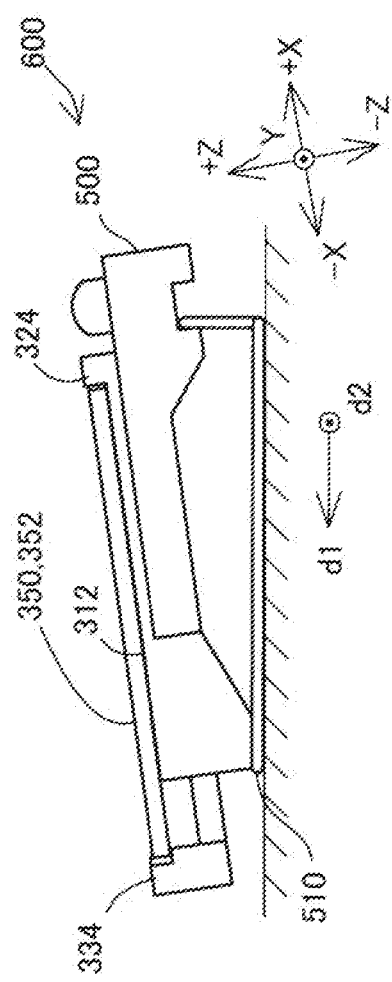
FIG. 9 is a schematic side view of a teaching unit in the second embodiment.

FIG. 8 is a perspective view of a teaching device 500 in a second embodiment. FIG. 9 is a schematic side view of a teaching unit 600 in the second embodiment. The teaching device 500 in the second embodiment is different from the teaching device 300 in the first embodiment in that the teaching device 500 includes a frame 510. In the following explanation, the same components as the components in the first embodiment are denoted by the same reference numerals and signs. Detailed explanation of the components is omitted.

When the teaching device 500 is placed, the frame 510 supports the case section 310 from the rear surface side, which is an opposite surface side of the mounting surface 312 of the case section 310. In FIG. 9, a first plane direction d1 and a second plane direction d2 in which a placement surface on which the teaching unit 600 is placed extends are shown. As shown in FIG. 9, when the teaching device 500 is placed on the placement surface, the mounting surface 312 extending along the X direction and the Y direction is inclined with respect to the placement surface.

As shown in FIG. 8, the width of the frame 510 in the Y direction is larger than the width of the case section 310 in the Y direction. Accordingly, when the teaching device 500 is placed and used, the posture of the case section 310 is stabilized by the frame 510. In this embodiment, the frame 510 is formed by bending a bar-like member and is detachably attached to the case section 310 of the teaching device 500. The frame 510 may not be detached from the case section 310.

As shown in FIG. 9, the display 352 of the portable terminal equipment 350 is attached to the teaching device 500 along the mounting surface 312. Accordingly, the display 352 of the portable terminal equipment 350 is inclined with respect to the placement surface.

The teaching device 500 in the second embodiment explained above achieves the same effects as the effects in the first embodiment in that the teaching device 500 includes the same components as the components in the first embodiment. The teaching device 500 further includes the frame 510. Accordingly, a user can operate the portable terminal equipment 350 in a state in which the display 352 of the portable terminal equipment 350 is inclined with respect to the placement surface. Therefore, it is easy to operate the teaching unit 600.

C. Other Embodiments

C1. First Another Embodiment

In the embodiments explained above, the teaching devices 300 and 500 may include structure for protecting the teaching devices 300 and 500 from a shock during a fall or the like. For example, a wall surface extending along a direction crossing the mounting surface 312 in an outer wall surface of the case section 310 may include a region formed by a material having rigidity smaller than the rigidity of the fixing section 340. More specifically, a part of a region, in particular, a corner, of a wall surface extending along the circumferential direction of the mounting surface 312 in the outer wall surface of the case section 310 may be formed of a material having rigidity smaller than the rigidity of the fixing section 340 or a material having rigidity smaller than the rigidity of the inner wall surface of the case section 310. More specifically, a part of the wall surface extending along the circumferential direction of the mounting surface 312 in the outer wall surface of the case section 310 may be formed of, for example, a rubber material or foamed resin such as urethane foam to protect the teaching device 300 from a shock during a fall.

C2. Second Another Embodiment

In the embodiments, the teaching devices 300 and 500 do not include a component defining the size in the Y direction among sizes of the mounting region on which the portable terminal equipment 350 is mounted. However, the teaching devices 300 and 500 are not limited to this. For example, the teaching devices 300 and 500 may include, in addition to the first restriction wall 324 and the second restriction wall 334, a member including a wall surface extending along the X direction and the Z direction, the wall surface defining one end and the other end in the Y direction of the mounting region. In this case, the distance between one end and the other end in the Y direction of the mounting region may be changeable.

C3. Third Another Embodiment

In the embodiments, the teaching devices 300 and 500 include the retaining member 314. However, the teaching devices 300 and 500 are not limited to this. The teaching devices 300 and 500 may include, instead of the retaining member 314, another component that suppresses movement of the portable terminal equipment 350 in the direction crossing the mounting surface 312. Specifically, the teaching devices 300 and 500 may include, instead of the retaining member 314, a claw section projecting toward the inside of the mounting space from at least one of the first wall surface 325 and the second wall surface 335. Even in this case, the claw section is caught by the portable terminal equipment 350, whereby the movement of the portable terminal equipment 350 in the direction crossing the mounting surface 312 is suppressed. The teaching devices 300 and 500 may not include the retaining member 314.

C4. Fourth Another Embodiment

In the embodiments, the teaching devices 300 and 500 include only the stop switch 370 as the component that transmits a signal indicating an instruction from the user. However, the teaching devices 300 and 500 are not limited to this. For example, the teaching devices 300 and 500 may include, in addition to the stop switch 370, a component for transmitting a signal indicating an instruction other than a stop. Specifically, the teaching devices 300 and 500 may include, for example, a reproduction button for causing the robot 100 to execute operation corresponding to teaching data, a temporary stop button for temporarily stopping the operation of the robot 100, and a button for instructing switching of the teaching method. The teaching devices 300 and 500 may include an operation button used in performing direct teach such as a teaching point storage button.

C5. Fifth Another Embodiment

In the embodiments, the teaching devices 300 and 500 include the first wire 301 and the second wire 302 to thereby set the transmission path for information between the portable terminal equipment 350 and the control device 200 and the transmission path for information between the teaching device 300 and the control device 200 as the physically different paths. However, the teaching devices 300 and 500 are not limited to this. For example, one wire may be used instead of the first wire 301 and the second wire 302.

C6. Sixth Another Embodiment

In the embodiments, the teaching devices 300 and 500 only relay information in the information transmission between the portable terminal equipment 350 and the control device 200. However, the teaching devices 300 and 500 are not limited to this. For example, the teaching devices 300 and 500 may include a storing section such as a RAM and temporarily store data transmitted from the portable terminal equipment 350 to the control device 200.

C7. Seventh Another Embodiment

In the embodiments, the teaching devices 300 and 500 enable the second member 330 to move relatively to the first member 320 using the fixing section 340 and the connecting section 332 including the plurality of attachment sections 3322. However, the teaching devices 300 and 500 are not limited to this. For example, the teaching devices 300 and 500 may not include the fixing section 340 and may have structure in which the first member 320 and the second member 330 are coupled in the X direction by an elastically deformable elastic member such as rubber or a spring. Even in this case, since the elastic member coupling the second member 330 and the first member 320 extends and contracts according to the size of the portable terminal equipment 350, the second member 330 moves relatively to the first member 320.

C8. Eighth Another Embodiment

In the embodiments, the teaching units 400 and 600 and the control device 200 are coupled by wired connection. However, coupling is not limited to this. For example, the teaching devices 300 and 500 and the control device 200 may be coupled by wireless connection such as Bluetooth (registered trademark). In this case, the teaching device 300 may be capable of automatically recognizing, through pairing or the like with the control device 200, the control device 200 coupled to the teaching device 300. The teaching devices 300 and 500 and the portable terminal equipment 350 may be coupled by wireless connection such as Bluetooth. In this case, the teaching device 300 may be capable of automatically recognizing, through pairing or the like with the portable terminal equipment 350, the portable terminal equipment 350 coupled to the teaching device 300. The portable terminal equipment 350 may be coupled to the control device 200 not via the teaching device 300. In this case, the portable terminal equipment 350 and the control device 200 may be coupled by wireless connection such as Bluetooth. When the teaching devices 300 and 500 are capable of being paired with the portable terminal equipment 350 and the control device 200, the teaching devices 300 and 500 may include a switch used for operation for the pairing in addition to the stop switch 370.

The first to eighth other embodiments explained above achieve the same effects as the effects in the first or second embodiment in that the first to eighth other embodiments include the same components as the components in the first or second embodiment.

The present disclosure is not limited to the embodiments explained above and can be realized in various configurations in a range not departing from the gist of the present disclosure. For example, technical features in the embodiments corresponding to technical features in the aspect described in the summary can be replaced or combined as appropriate in order to solve a part or all of the problems described above or achieve a part or all of the effects described above. If the technical features are not explained in this specification as essential technical features, the technical features can be deleted as appropriate.

(1) According to an aspect of the present disclosure, there is provided a teaching device on which portable terminal equipment is mounted, the teaching device being used to teach operation to a robot. The teaching device includes a case section including a mounting surface on which the portable terminal equipment is mounted. The case section includes: a first member including a stop switch for stopping the operation of the robot and configured to restrict the portable terminal equipment's moving in a first direction extending along the mounting surface; and a second member provided to be capable of moving in the first direction relatively to the first member and configured to restrict the portable terminal equipment's moving in an opposite direction of the first direction. According to this aspect, since the size of a mounting region in the first direction can be changed, in the teaching device, it is possible to mount the portable terminal equipment having any size on the case section without separately preparing a member for changing the mounting region. Consequently, an operator does not need to replace an attachment, which is the case section. It is possible to reduce time for replacing the attachment.

(2) The teaching device according to the aspect may further include a fixing section configured to fix a position of the second member with respect to the first member. According to this aspect, since the position of the second member does not deviate with respect to the first member, it is possible to appropriately mount the portable terminal equipment.

(3) The teaching device according to the aspect may further include an elastic member for applying, to the second member, an urging force applied in a direction from the second member side toward the first member side in the first direction. According to this aspect, since the portable terminal equipment can be gripped by the first member and the second member, a mounting position of the portable terminal equipment is stabilized.

(4) The teaching device according to the aspect may further include: a first wire for transmitting, to the robot, a stop signal output by the stop switch; and a second wire for transmitting, to the robot, a signal output from the portable terminal equipment. A transmission path for the signal by the first wire and a transmission path for the signal by the second wire may be systems different from each other. According to this aspect, even in a state in which the portable terminal equipment is not mounted, the teaching device can execute a stop.

(5) The teaching device according to the aspect may further include a frame configured to support the case section from a rear surface side of the mounting surface. The frame may support the case section such that, when the teaching device is placed on a placement surface on which the case section is placed via the frame, the mounting surface is inclined with respect to the placement surface. Width of the frame in a second direction perpendicular to the first direction among directions extending along the mounting surface may be larger than width of the case section. According to this aspect, when the teaching device is mounted and used, the posture of the case section is stabilized by the frame. Since the mounting surface is inclined with respect to the placement surface, operability of the portable terminal equipment is improved.

(6) In the aspect, the second member may include a wall opposed to a side surface of the portable terminal equipment when the portable terminal equipment is mounted, the wall may include a communication section configured to cause one side and another side across the wall to communicate in the first direction, and the teaching device may further include a connecting wire extending from the portable terminal equipment to the case section via the communication section and electrically coupling the portable terminal equipment and the teaching device. According to this aspect, it is easy to couple the portable terminal equipment and the case section.

(7) In the aspect, the second member may include a member configured to suppress movement of the portable terminal equipment in a direction crossing the mounting surface. According to this aspect, it is possible to reduce likelihood that the portable terminal equipment comes off the teaching device.

(8) In the aspect, a wall surface extending along a direction crossing the mounting surface in an exterior of the case section may include a region formed of a material having rigidity smaller than rigidity of the fixing section. According to this aspect, it is possible to reduce likelihood of breakage of the teaching device.

The present disclosure can also be realized in various forms other than the teaching device. The present disclosure can be realized in a form of, for example, a robot system including the teaching device and the robot.

What is claimed is:

1. A teaching device on which portable terminal equipment is mounted, the teaching device being used to teach operation to a robot,
    the teaching device comprising a case section including a mounting surface on which the portable terminal equipment is mounted, wherein
    the case section includes:
        a first member including a stop switch for stopping the operation of the robot and configured to restrict movement of the portable terminal equipment in a first direction extending along the mounting surface; and
        a second member configured to move in the first direction with respect to the first member,
    the second member restricts the movement of the portable terminal equipment in an opposite direction of the first direction,
    the teaching device only has the stop switch for controlling the operation of the robot, and
    the stop switch is located at the center of the case section along a second direction perpendicular to the first direction.

2. The teaching device according to claim 1, further comprising a fixing section configured to fix a position of the second member with respect to the first member.

3. The teaching device according to claim 2, wherein a wall surface extending along a direction crossing the mounting surface in an outer wall surface of the case section includes a region formed of a material having rigidity smaller than rigidity of the fixing section.

4. The teaching device according to claim 1, further comprising an elastic member for applying, to the second member, an urging force applied in a direction from the second member toward the first member.

5. The teaching device according to claim 1, further comprising:
    a first wire for transmitting, to the robot, a stop signal output by the stop switch; and
    a second wire for transmitting, to the robot, a control signal output from the portable terminal equipment, wherein
    a transmission path for the stop signal by the first wire and a transmission path for the control signal by the second wire are different from each other.

6. The teaching device according to claim 1, further comprising a frame configured to support the case section from a surface side opposite to the mounting surface, wherein
    the frame supports the case section such that, when the teaching device is placed on a placement surface on which the case section is placed via the frame, the mounting surface is inclined with respect to the placement surface, and
    a width of the frame in the second direction extending along the mounting surface is larger than a width of the case section in the second direction.

7. The teaching device according to claim 1, wherein
    the second member includes a wall opposed to a side surface of the portable terminal equipment when the portable terminal equipment is mounted,
    the wall includes a communication section communicating in the first direction, and the teaching device further comprises a connecting wire extending from the portable terminal equipment to the case section via the communication section and electrically coupling the portable terminal equipment and the teaching device.

8. The teaching device according to claim 1, wherein the second member includes a member configured to suppress the movement of the portable terminal equipment in a direction crossing the mounting surface.

9. A robot system comprising:
the teaching device according to claim 1; and
the robot that is taught the operation by the teaching device.

* * * * *